(12) United States Patent
Wewalaarachchi et al.

(10) Patent No.: US 7,715,326 B2
(45) Date of Patent: May 11, 2010

(54) WEBSERVER ALTERNATIVE FOR INCREASED SECURITY

(75) Inventors: Bandu Wewalaarachchi, Singapore (SG); Hari Gunasingham, Singapore (SG); Lakshita Sanjeewa, Dehiwala (LK); Viraj Sanjaya, Kandana (LK)

(73) Assignee: Eutech Cybernetics Pte. Ltd., Singapore (SG)

( * ) Notice: Subject to any disclaimer, the term of this patent is extended or adjusted under 35 U.S.C. 154(b) by 1813 days.

(21) Appl. No.: 10/645,855

(22) Filed: Aug. 22, 2003

(65) Prior Publication Data
US 2005/0063357 A1 Mar. 24, 2005

(51) Int. Cl.
*G06F 15/16* (2006.01)
(52) U.S. Cl. ..................... 370/254; 709/228
(58) Field of Classification Search ............. 370/389, 370/358, 473, 474, 357, 351, 229, 230, 254, 370/310; 709/212, 217, 218, 219, 232, 226, 709/228, 229
See application file for complete search history.

(56) References Cited

U.S. PATENT DOCUMENTS

| | | | | |
|---|---|---|---|---|
| 5,550,984 A | * | 8/1996 | Gelb | 709/245 |
| 6,128,298 A | * | 10/2000 | Wootton et al. | 370/392 |
| 6,711,171 B1 | * | 3/2004 | Dobbins et al. | 370/400 |
| 6,754,831 B2 | | 6/2004 | Brownell | 726/15 |
| 6,931,016 B1 | * | 8/2005 | Andersson et al. | 370/401 |
| 7,068,647 B2 | * | 6/2006 | Fangman et al. | 370/352 |
| 7,107,341 B2 | * | 9/2006 | Mousseau et al. | 709/224 |

FOREIGN PATENT DOCUMENTS

| | | |
|---|---|---|
| EP | 0 965 927 | 12/1999 |
| WO | WO 00/14620 | 3/2000 |
| WO | WO 01/55813 | 8/2001 |
| WO | WO 02/30082 A2 * | 4/2002 |

OTHER PUBLICATIONS

International Search Report and Written Opinion mailed on Oct. 3, 2005 directed at counterpart International Application No. PCT/SG2004/228; 7 pages.

* cited by examiner

*Primary Examiner*—Seema S Rao
*Assistant Examiner*—Mon Cheri S Davenport
(74) *Attorney, Agent, or Firm*—Morrison & Foerster LLP

(57) ABSTRACT

A system and method for preventing unauthorized access to a website's sensitive information in which a website web server is located on a public network with a public IP address and known port number, but only performs a listening function. The responding function is located on a separate device on a private network with a private and dynamic IP address and having a randomly assigned port number. The responder has no listening sockets (open ports expecting to receive from client application) and therefore does not listen to the public network, and therefore is not accessible to unauthorized access, much in the way that a private user's PC is not accessible to unauthorized access. The web server having the listening function does not initiate connection with the device having the responding function because its private IP address is unreachable from the public network and unknown, even to the web server, and by virtue of the fact that there are no listening sockets to accept any requests. Instead, the communication link between the device having the responder function and the web server having the listening function is initiated by the device having the responder function.

10 Claims, 6 Drawing Sheets

WEBSERVER ALTERNATIVE FOR INCREASED SECURITY

FIELD OF THE INVENTION

This invention relates to methods and systems for increasing security over the internet. More particularly, this invention relates to a system and method for providing public access to websites while providing increased security for private databases and applications that are accessed by the website in order to respond to user inquiries.

BACKGROUND OF THE INVENTION

The internet may be loosely described as a public network, or a collection of public networks, consisting generally of a collection of distributed IP devices, e.g., PCs, printers, routers, servers, etc., each of which have a distinct IP address, e.g., 1.1.1.1, 1.1.1.2, . . . 1.1.1.10. See, e.g., FIG. 1. There also exist many private networks which themselves comprise collection of IP devices, each having a discrete IP address which theoretically may be identical to the IP address for a completely different device located on a different private network or located on a public network. Private networks are often connected to the public networks through a gateway (router or proxy). Devices on one private network can communicate or "address" a device on a public network through the gateway that acts as a proxy to the public network. If a device on a private network knows the IP address of device in the same private network or public network, the first device can directly address the second device using the above principle.

Accordingly, in order to address a device on the internet, it is necessary to know its IP address. The websites that make up much of what is considered by the public to be "the internet" reside on web servers which have addresses on a public network (a public IP address). By contrast, most users access the internet through PCs residing on a private network which provides a gateway to the public networks (these gateways are commonly referred to as Internet gateways and carry two IP addresses, one on the private network and the other on a public network). While these devices on private networks are described as having IP addresses, these IP addresses are usually private (they are not addressable by users outside of the private network on which it resides) and dynamic (the IP address for a particular device on a private network is assigned automatically by a DHCP (dynamic host configuration protocol) server in order to reduce network management overheads created by conflicting IP addresses).

Both the browser in a user's PC and a website residing on a web server have port numbers for receiving communications into the correct application that runs in the device. However, in contrast to the private and dynamic port numbers assigned to browsers and other client applications in a user's PC, website port numbers are public and well known. The port number for websites on the http network is 80; the port number for websites on the https is 443; and the port number for websites on the FTP network is 21. Accordingly, when a user's PC browser sends a request to a website, it uses the website's IP address together with the appropriate port to address the website and accompanies the message with the PC's temporary dynamic IP address as well as the transient port number that corresponds to the browser which generated the request. The website, in responding to the request, directs the response to the dynamic IP address and port number that accompanied the request. See, e.g., FIG. 2.

The way that PCs with dynamic IP addresses on a private network can receive information from a website web server on a public network may be described as follows: the user types into a browser application running on his PC the public IP address for a website web server. The user's PC then directs a request to the website web server at the specified address and well-known port number. The request generated by the user's PC includes its return address (its private dynamic address) and a "port number", which is also known as "TCP socket," that will be open for a short specified time in order to receive the reply. The TCP socket identifies the particular application on the user's computer to which the reply should be directed—any one user may have several browsers open on his PC, using each browser to communicate with different websites.

Although a device in the private network is able to address a device in the public network through a gateway (which serves as a proxy for the public network), a website cannot address the PC in the private network due to the fact that private IP is not a 'global address' and it is not addressable from the public network. To enable the website to send the reply back to the private PC, the gateway manages a temporary network address translation table (NAT) which gets built dynamically as communication takes place. When a request from private network travels to the public network via the gateway, it forwards the request to the website with its own public IP address and a randomly picked port number as the return socket. Also, the gateway adds an entry to the NAT to map that socket to the return IP address and port number of the browser or other client application that generated the request. When the reply is received from the website, the gateway forwards it to the client application the generated the request after performing a lookup in the NAT. Once the communication is completed (TCP connection is closed), the related entry in the NAT is removed; therefore, no more data packets can travel into the private network. If someone attempts to initiate a TCP communication into the private network, the gateway does not allow it by virtue of the fact that there is no address mapping in the NAT (unless it has been specifically setup to act as a reverse proxy as described below).

In this fashion, a public website can always be addressed by a client application on a private network, while a private user's PC cannot be addressed from the Internet.

As discussed above, websites traditionally reside on "web servers" which have a static public IP address on a public network. Alternatively, the web server may be represented on the public network by a router or "reverse proxy" which directs inquiries to the web server which may be placed on a private network. See, e.g., FIG. 3. In this case, the proxy or router will map its public IP address to the private address of the web server, and redirect inquiries coming into the public IP address to the web server address. This method is also known as "reverse proxy" or "IP forwarding" or "protocol tunneling" with slight variation in implementation. In either case, the principle is to forward the request coming from a client application (or an Internet gateway of another private network) on the Internet to the web server.

Websites, in contrast, by virtue of the fact that they have public addresses, are subject to unauthorized access. As mentioned above, websites typically reside on a web server and comprise two primary functional units: a listening unit and a responder unit. The listening unit, which maintains an open line of communication with the public network and receives requests for information from other devices (users) located on the public network or on private networks with access to the public network. The responder unit contains the ASP pages, CGI applications, etc., in effect defining that information which is to be published or made available for publication.

When the responder receives a request for information, the responder typically accesses a memory, for example via a database application, containing public and sensitive information. Many websites also have access to private "source data" which may be used to generate the public or sensitive information for publication to authorized users. The responder unit serves as the gateway for determining which requesting devices are entitled to sensitive and/or public information in the website. The responder unit is typically designed so as not to give away, or "publish," the private source data. Rather, it only uses the private source data to generate the public and/or sensitive information which is then published to authorized users via the website. In order to prevent unauthorized access to sensitive information and private source data that available to a website responder unit, network engineers design "firewalls" which will attempt to identify instances of unauthorized access to the website's data sources. This is primarily done by blocking outside users or devices from initiating TCP/IP connections into the protected network through specific ports (known as "blocking incoming ports"). However, firewalls cannot fully close all incoming ports into the website because certain ports must remain open for the web server to function. Further, a firewall only blocks the initialization of a TCP connection (at the beginning of the TCP conversation) by inspecting traffic that targets a specific port. After the initialization, the traffic has to pass through the firewall in both directions with randomly assigned ports, and the firewall has to allow it to happen. Therefore, unlike in the case of a proxy, a firewall is unable to isolate the network from unauthorized incoming traffic. Each call comes from a 'visitor' of the Internet, which could potentially be a hacker.

SUMMARY OF THE INVENTION

The present invention arises from the realization of the inventors that unauthorized users can circumvent firewall protection of a website's data sources by downloading a software file onto the website web server which replaces or modifies the existing website responder unit. See FIG. 4. Such replacement responder unit would be different from the original responder unit at least to the extent that it would allow the unauthorized user unlimited access to the website's data sources. In other words, the responder unit of the website, which controls access to the public and sensitive information and private source data contained in the website's data sources, might be replaced by a responder unit of the unauthorized user's own design, which design could permit unrestricted access by the unauthorized user to all of the sensitive information and private source data to which the website has access.

The present invention relates to a system and method which prevents this and other types of unauthorized access to sensitive information and private source data is used to serve websites which are accessible to the public. According to the invention, the website web server located on a public network having a public IP address and known port number performs only the listening function. The responding function is located on a separate device on a private network with a private and dynamic IP address and having a randomly assigned port number. The responder has no listening sockets (open ports expecting to receive from client application) and therefore does not listen to the public network, and therefore is not accessible to unauthorized access, much in the way that a private user's PC is not accessible to unauthorized access. The web server having the listening function does not initiate connection with the device having the responding function because its private IP address is unreachable from the public network and unknown, even to the web server, and by virtue of the fact that there are no listening sockets to accept any requests. Instead, the communication link between the device having the responder function and the web server having the listening function is initiated by the device having the responder function. Much in the way that a private user's PC on a private network opens a line of communication with a web server on a public network by sending a transmission which includes the PC's dynamic IP address and port number, the responder establishes a single encrypted connection to the web server, with a private and dynamic IP address and port number for responsive communications. In this fashion, the device on the private network having the responder function has access to the sensitive information and private source data and uses that information to provide information to the listening function for publication, but neither the responder nor the data sources are accessible to unauthorized users because there is only a single connection between the responder and the listener which connection is initiated by the responder. Thus, separation of the listening and responsive functions into two separate devices, with the responder device located on a private network, protects the responder functionality from unauthorized access by virtue of the fact that all communication between the listener and responder is transmitted over the responder initiated single TCP/IP connection. Further, the communication is encrypted for enhanced security.

DESCRIPTION OF THE PREFERRED EMBODIMENT OF THE INVENTION

Figure 1:
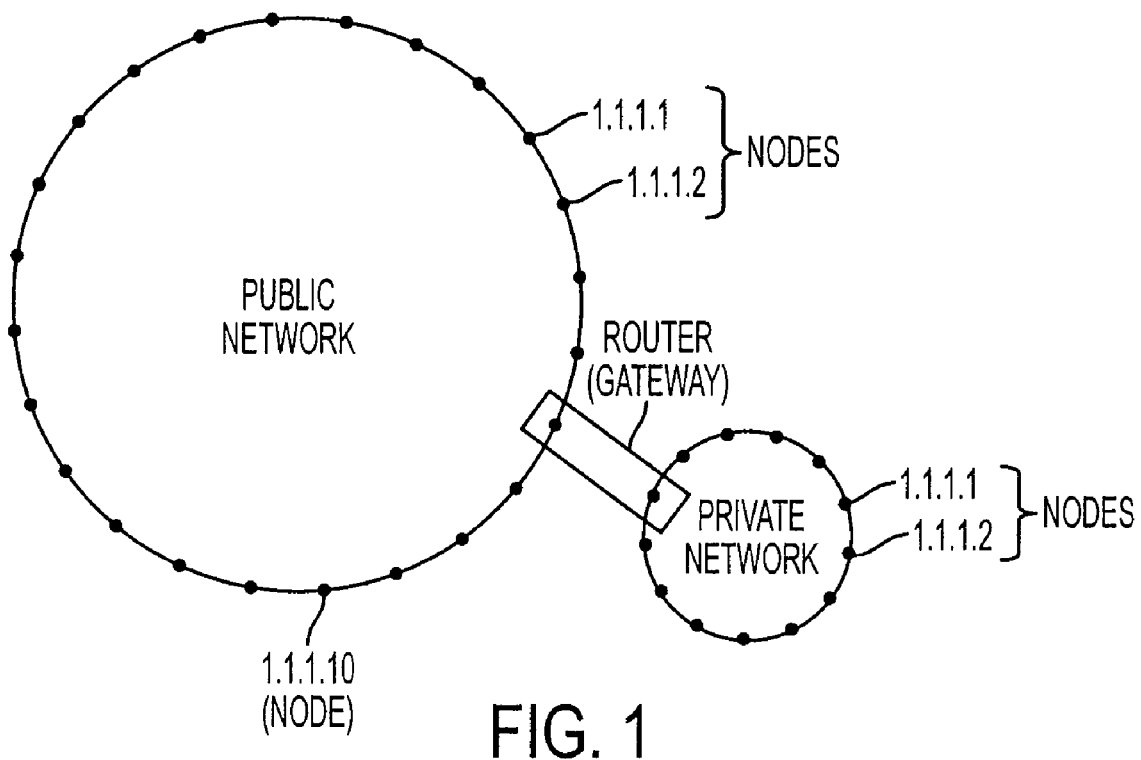
FIG. 1 shows a schematic representation of a private network in communication with a public network.
Figure 2:
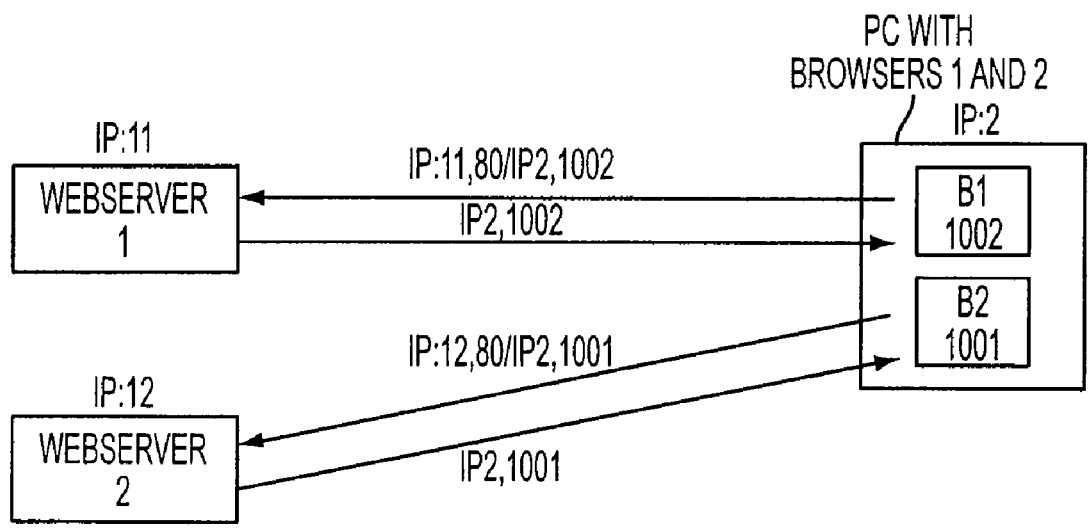
FIG. 2 illustrates the communication between the browsers on a private user's PC on a private network with web servers located on a public network.
Figure 3:
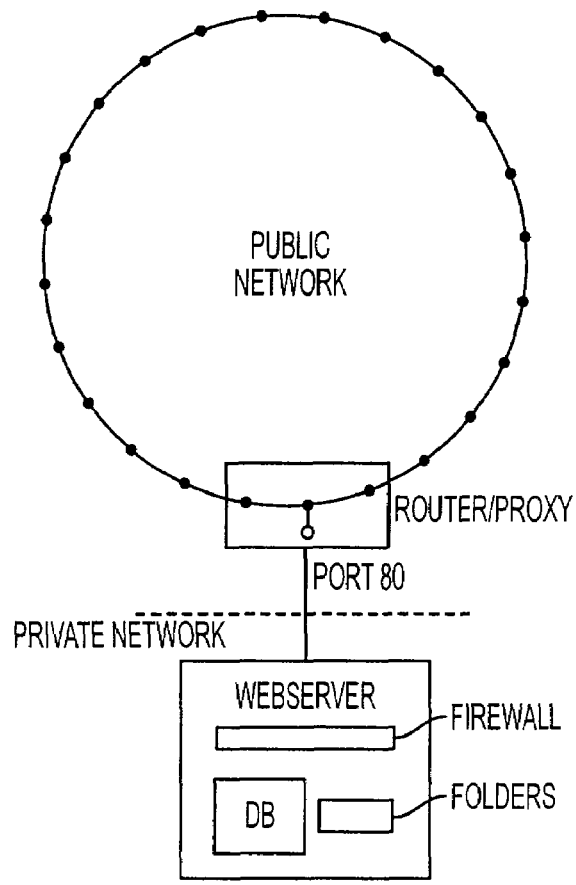
FIG. 3 is a schematic representation of a website on a private network represented on a public network by a router or "reverse" proxy.
Figure 4:
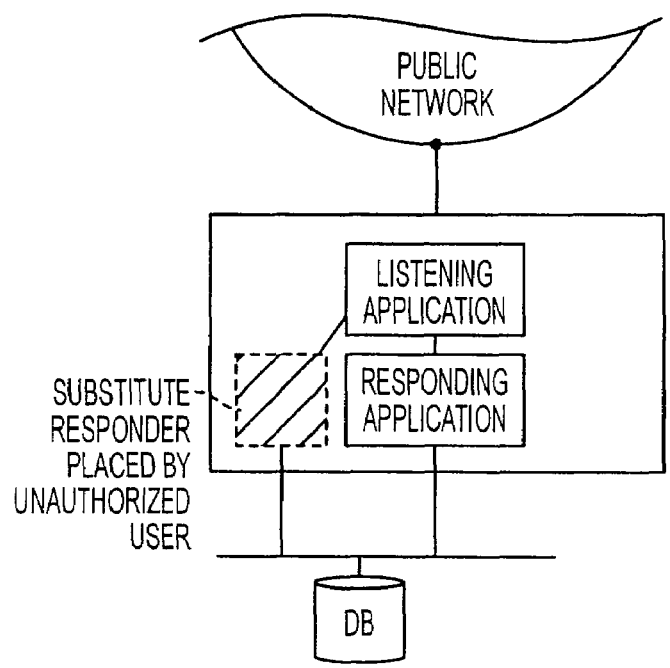
FIG. 4 is a schematic representation of a web server in which an unauthorized user has placed a substitute responder, giving that user access to sensitive information and private source data on the database
Figure 5:
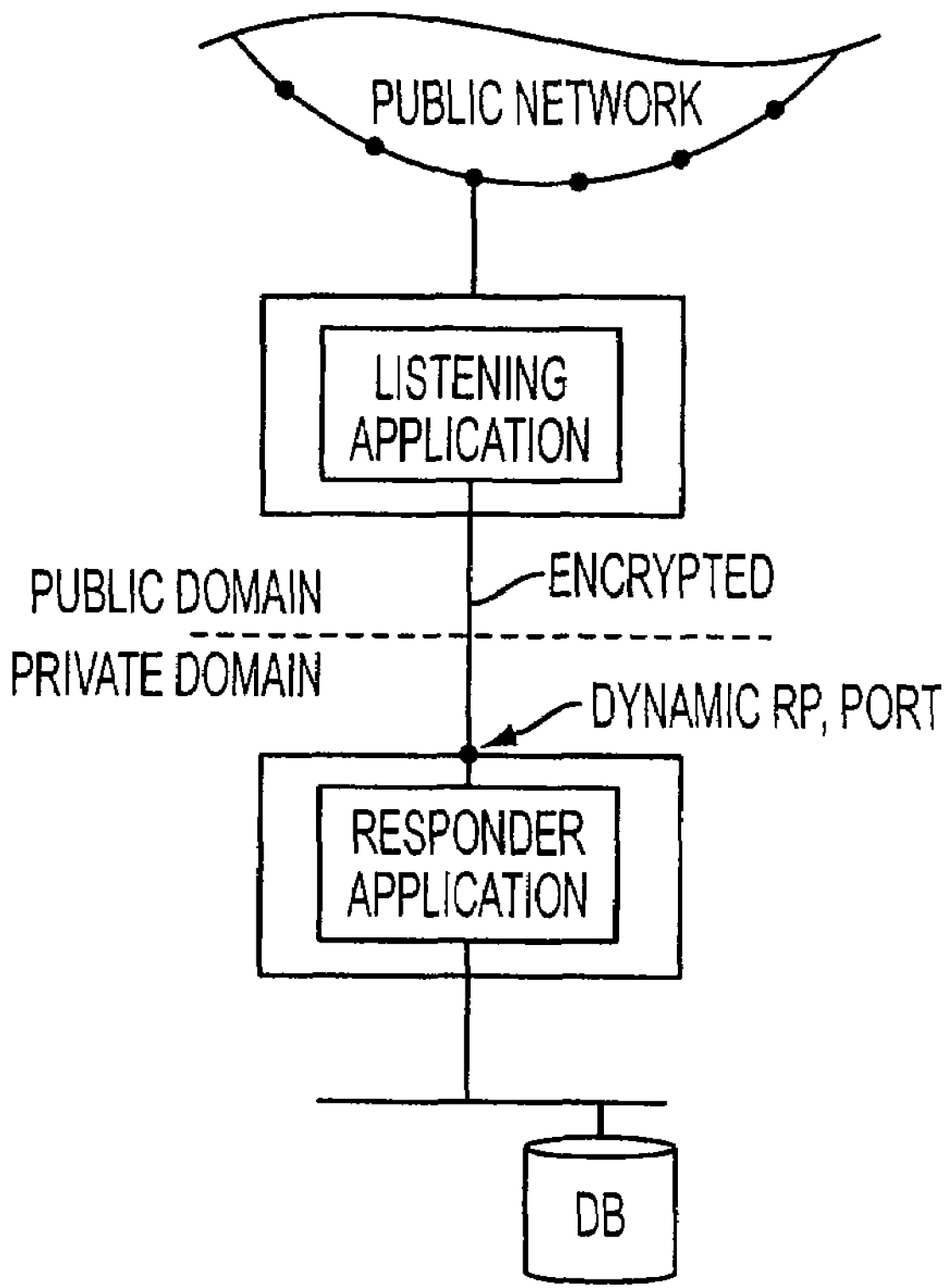
FIG. 5 is a schematic representation of the invention showing a server having only the listening function of a website located on a public network and a separate device having the responder function located on a private network with a dynamic IP address and port number with a single encrypted connection between the responder device and a listening server which is established by the responder device.

Referring to FIG. 5, an IP device such as a server is located on a public network, with a public IP address and known port number. This device contains a listening function for a website which receives communications and inquiries for information from other devices located on the public network or on private networks in communication with the public network. This listening function also transmit responses to the requesting devices. A second IP device is located on a private network and contains the responder function of a traditional website. This service has a dynamic private IP address. The responder function is in communication with a data source, e.g., a database. The data source may contain public and sensitive information and/or private source data necessary or useful in responding to inquiries received by the listening function. The responder function initiates a single connection with the listening function, transmitting its dynamic IP address and randomly assigned port number for responsive communications. This line of communication may be established in much the same way that a private PC on a private network opens a line of communication with a traditional website as described above in the background of the invention. This single line of communication is preferably encrypted. When the listening function receives a request for information from another device on the public network or on a private network in communication with the public network, the listening function "responds" to the opening communication established by the responder using the dynamic IP address and port number transmitted by the responder in the opening communication. The responder function processes the request, optionally accessing information in the data source(s), and communicates their response to the listening function, which in turn publishes the information to the requesting device using the requesting device's IP address and port number. Preferably, the only connection between the device having the responder function and the public network is the single encrypted connection with the listening server, established by the responder device using its dynamic IP address and randomly assigned port number. Furthermore, the responder that initiates the TCP/IP connection with the listener intercepts all the incoming messages from the listener, and does not carry out any function that can be harmful to the system. In this fashion, there can be no unauthorized access to the device carrying the responding function, and hence no unauthorized access to the data base which may contain sensitive information and private source data.

Figure 6A:
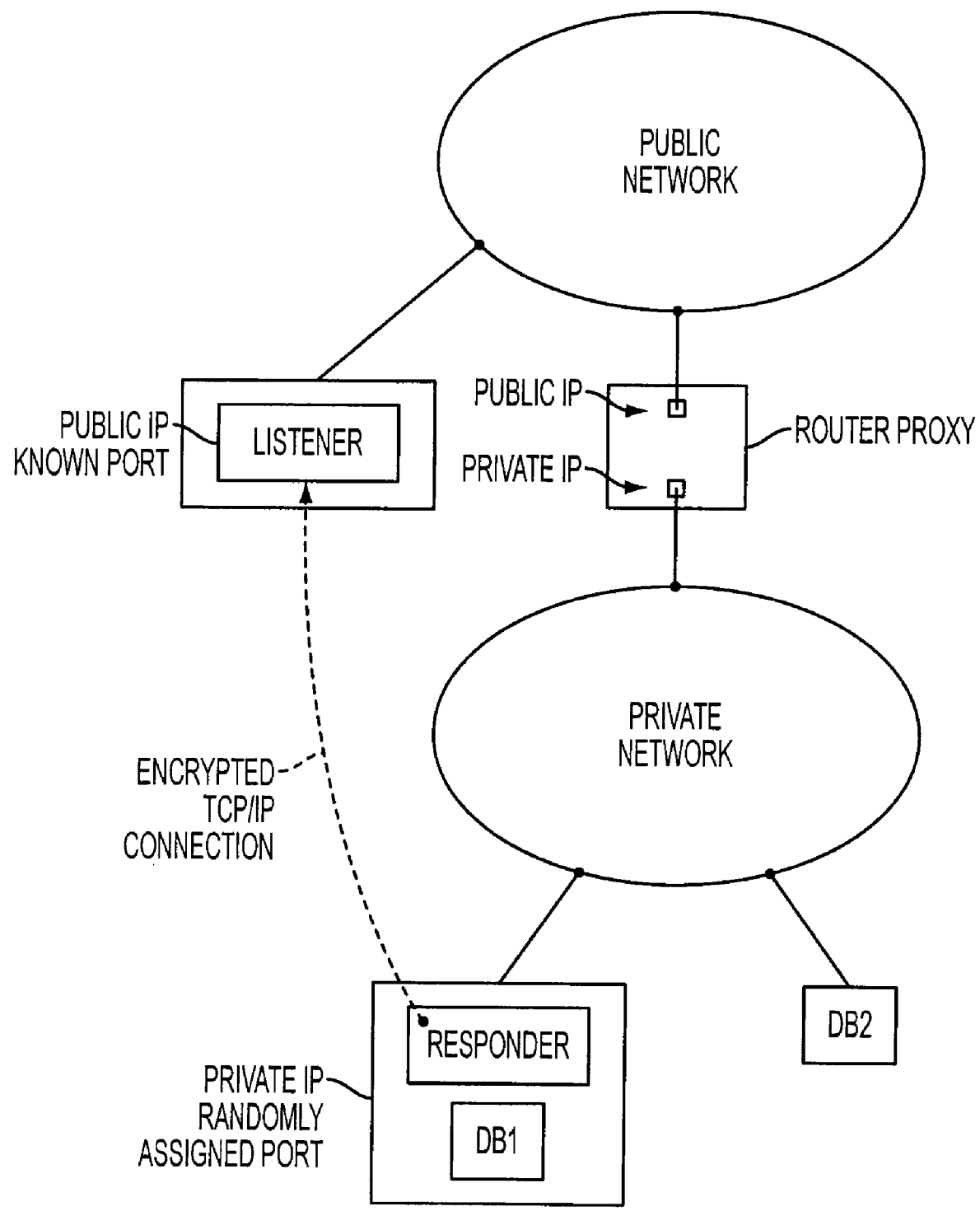
FIG. 6A is a schematic representation of a preferred embodiment of the invention.

FIG. 6A shows a more preferred embodiment of the invention in which the responder unit is connected to a private network and has a private IP address and a randomly assigned port number. It can access other devices on the private network, but cannot be addressed by devices outside the private network. The listener unit is connected to a public network with a public IP address and known port number. The responder unit initiates communication with the listener unit via an encrypted TCP/IP connection. Accordingly, neither th responder unit, other applications residing on the same device, or other devices to which the responder unit has access are susceptible to unauthorized access, either via the listener or via the responder's connection to its private network.

Figure 6B:
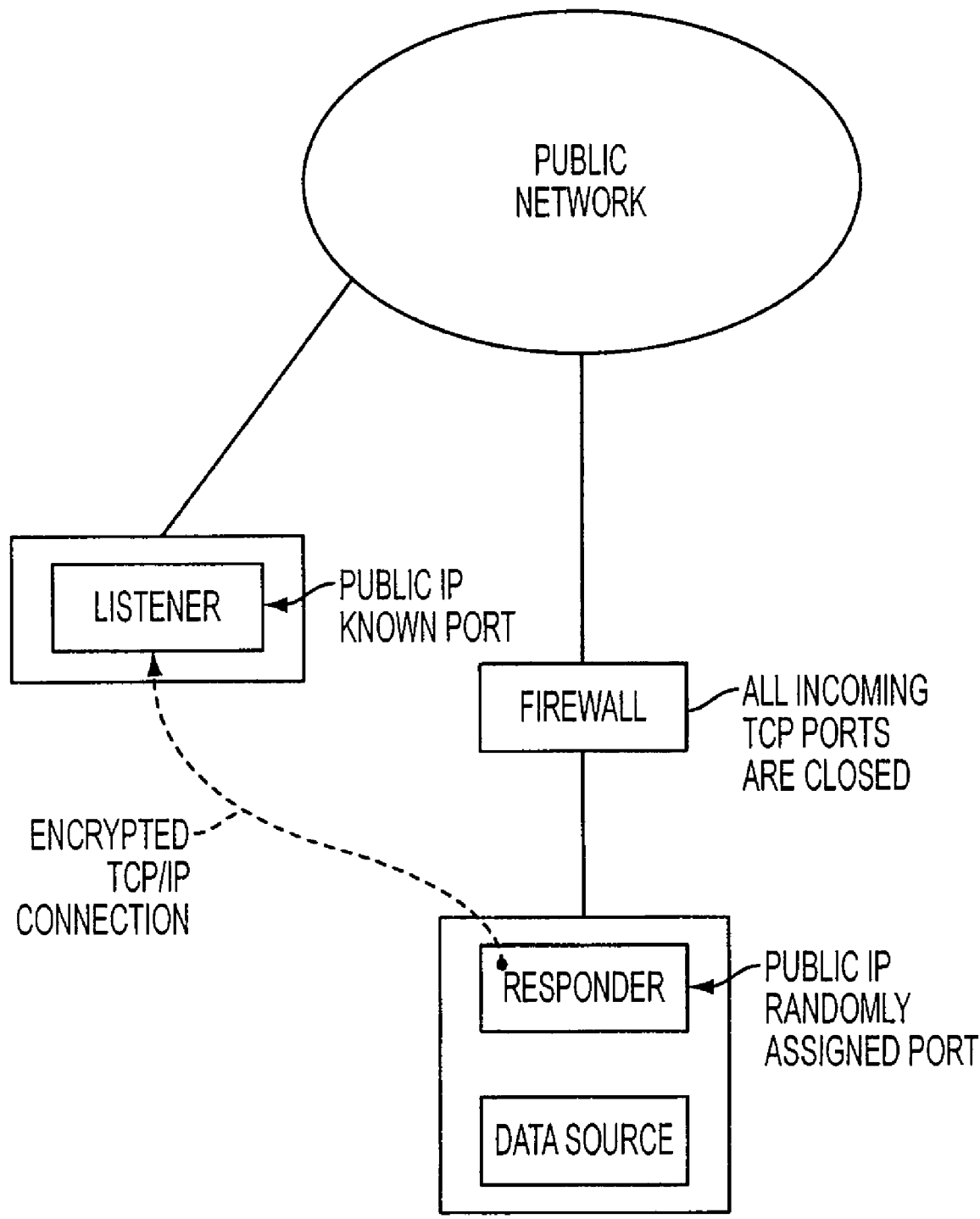
FIG. 6B is a schematic representation of another embodiment of the invention.

FIG. 6B shows another embodiment of the invention in which the responder function is moved to another public address as opposed to a private network. In this embodiment, all the "incoming ports" are closed in the firewall to protect the responder from TCP/IP level attacks, and the responder device communicates with the listener device via an encrypted TCP/IP connection. Therefore, the responder unit is not susceptible to unauthorized access via the listener unit. However, the responder device is still addressable over the internet. Accordingly, the ultimate security of this embodiment depends heavily on the stability of the firewall.

Figure 6C:
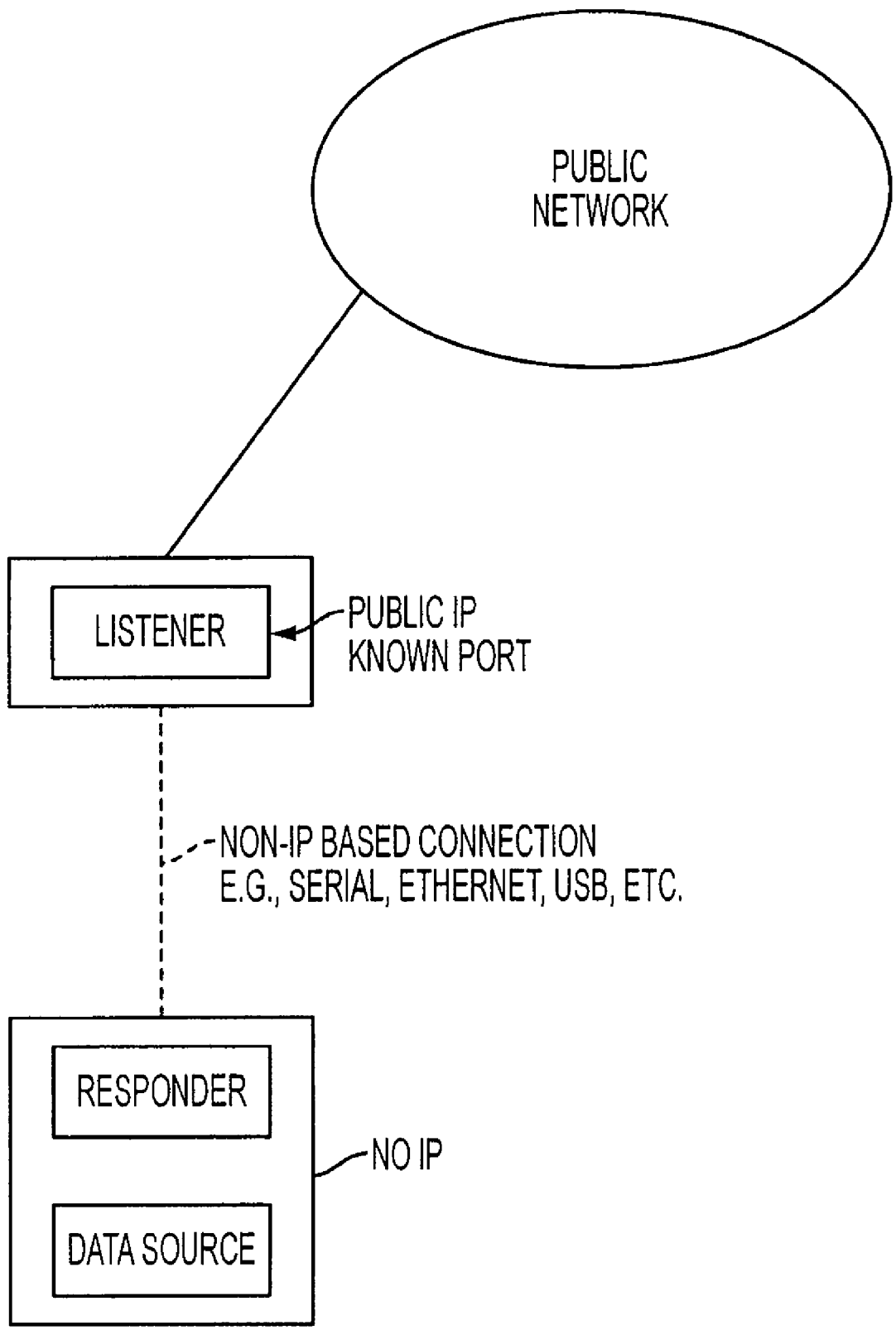
FIG. 6C is a schematic representation of another embodiment of the invention.

FIG. 6C shows yet another embodiment of the invention in which the connection from the responder unit is not addressable via any network, public or private, and in which its connection to the listening unit is non-IP based, for example, via IPX, ethernet (below IP level), serial communication, USB or Fireware.

The invention claimed is:

1. A system for supporting a website comprising:
   an IP device located on a public network, the IP device having a public IP address and a known port number; and
   a second device located outside the public network, the second device not including a listening socket;
   wherein a connection exists between the second device and the IP device, which connection is initiated by the second device; and
   the IP device cannot initiate a connection with the second device due to the second device not having a listening socket.

2. A system according to claim 1 wherein the second device is located on a private IP network with a private IP address.

3. A system according to claim 2 wherein the communication protocol between the IP device and the second device is TCP/IP or application level protocol based on TCP/IP.

4. A system according to claim 1 wherein the communication between the IP device and the second device is encrypted.

5. A system according to claim 1 wherein the second device comprises a memory storing information for publication or private source data.

6. A system according to claim 1 further comprising a third device connected to the second device through a private network, the third device comprising a memory storing information for publication or private source data.

7. A system for supporting a website comprising:
   an IP device located on a public network, the IP device having a public IP address and a known port number;
   a second device located on a private network having a responder function with a private IP address and port number, the second device not including a listening socket; and
   a third device having a memory storing information for publication or private source data, located on the private network in communication with the second device;
   wherein a single connection exists between the second device and the IP device, which connection is initiated by the second device and wherein the IP device cannot initiate a connection with the second device by virtue of the private IP address of the second device, the private IP address being dynamic.

8. A method for increasing security for sensitive information or source data contained in a memory which is used to respond to inquiries directed to a website by safeguarding a responder function, comprising:
   providing on a public network an IP device having a public IP address and known port number, the IP device having an application that corresponds to a listening function of a website;
   providing an application corresponding to a responder function of a website, wherein the responder application is isolated from the IP device;
   the responder application registering with the listening application and subscribing to receive incoming requests by initiating a communication channel to the listening application as a communication client;
   the listening application receiving a request from a remote application and sending incoming requests only to the registered responder application;
   processing the incoming requests by the responder application; and returning results to the remote application via the listening application.

9. A method for increasing security for sensitive information or source data contained in a memory which is used to respond to inquiries directed to a website by allowing them to be placed in a private network along with a responder function, comprising:

providing on a public network an IP device having a public IP address and known port number, the IP device having an application that corresponds to a listening function of a website;

providing on a private network a second IP device having a private IP address, the second IP device having an application corresponding to a responder function of a website;

the responder application initiating an outgoing TCP connection to the listening application as a communication client and registering to receive incoming requests;

the listening application receiving a request from a remote application and sending incoming requests to the responder application;

processing the incoming requests by the responder application by optionally accessing the source data; and returning results to the remote application via the listening application.

10. A method for increasing security for sensitive information which is used to respond to inquiries directed to a website, comprising:

providing on a private network an IP device having a dynamic IP address and port number, the IP device having an application corresponding to a responder function of a website, the IP device not including a listening socket;

providing on a public network a second IP device having a public IP address and known port number, the second IP device having an application that corresponds to a listening function of a web site;

causing the responder application in the IP device to establish a connection with the listening application in the second IP device, communication including the IP address for the IP device and a port number for the responder application;

receiving communications at the second IP device from other IP devices located on the public network or from devices located on private networks in communication with the public network;

transmitting requests for information relating to inquiries from the listening application to the responder application over the connection established by the responder application;

processing the requests for information by the responder application;

providing a response from the responder application to the listening application over the connection established by the responder application; and transmitting from the listening application to the other IP devices information relating to the requests.

* * * * *